W. F. DOYLE.
STEERING MEANS FOR TRACTORS.
APPLICATION FILED JUNE 4, 1914.
1,195,341.
Patented Aug. 22, 1916.
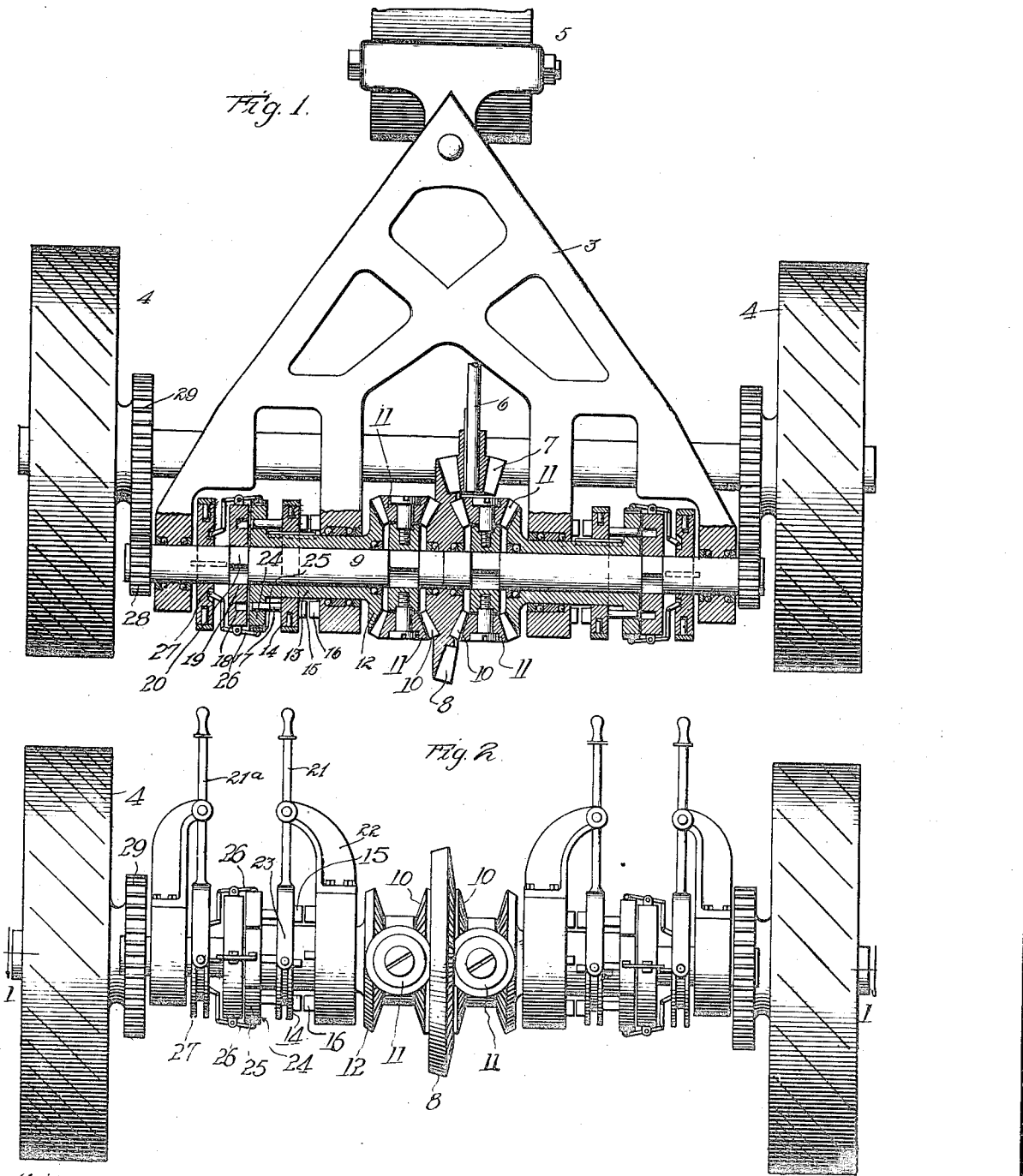

UNITED STATES PATENT OFFICE.

WILLIAM F. DOYLE, OF REEDSBURG, WISCONSIN, ASSIGNOR OF ONE-HALF TO EDWARD G. STOLTE, OF REEDSBURG, WISCONSIN; FLORENCE P. STOLTE EXECUTRIX OF SAID EDWARD G. STOLTE, DECEASED.

STEERING MEANS FOR TRACTORS.

1,195,341.      Specification of Letters Patent.   Patented Aug. 22, 1916.

Application filed June 4, 1914. Serial No. 842,973.

*To all whom it may concern:*

Be it known that I, WILLIAM F. DOYLE, a citizen of the United States, residing at Reedsburg, in the county of Sauk and State of Wisconsin, have invented new and useful Improvements in Steering Means for Tractors, of which the following is a full, clear, concise, and exact description, reference being had to the accompanying drawing, forming a part of this specification.

My invention relates to steering mechanism for traction engines and the like.

It is one of the objects of my invention to provide means for steering a traction engine from the driven wheels and particularly a tractor of the type having a pair of driven wheels and a single forward caster.

It is a further object of my invention to provide means for so steering a traction engine without loss of power and such that the steering operation is simple, accurate and efficient.

Additional objects and advantages will be apparent from the following description taken in connection with the appended claims.

In the following specification and accompanying drawing I have described and illustrated, as an example, an embodiment of my invention, it being understood that changes may be made in the form, construction, and arrangement of the parts without departing from the spirit of the invention or exceeding the scope of the appended claims, the form of the invention herein disclosed being merely one preferred embodiment thereof.

In the drawing: Figure 1 is a cross sectional view of a tractor having associated therewith steering mechanism constructed in accordance with my invention, the section being taken on the line 1—1 of Fig. 2; and Fig. 2 is a view in rear elevation of the tractor.

Referring to the drawing, on the frame 3 of a tractor having a pair of traction wheels 4 and a forward caster 5 of ordinary construction, is an engine (not shown) of any suitable type. Driven by this engine is a transmission shaft 6 at the end of which is a bevel pinion 7 meshing with a large bevel gear 8 suitably mounted to rotate on a divided shaft 9. On each face of the gear 8 and preferably integral therewith are bevel gears 10, each of which meshes with a pair of bevel pinions 11 the trunnions of which are secured to squared portions of the shaft 9 and consequently rotate therewith. Inasmuch as the parts associated with each section of the divided shaft 9 are identical the description of one set only is necessary.

The pinions 11, one pair of which is on each section of the shaft 9, mesh with a bevel gear 12 which is secured to or integral with a sleeve 13 suitably mounted to rotate on the shaft 9. Secured to the sleeve 13 to rotate therewith, but to be slidable thereon, is a drum 14 having on its inner side clutch members 15 adapted to engage corresponding clutch members 16 which are fast on the frame 3, when the drum 14 is moved inwardly. On the outer side of the drum 14 are pins 17 adapted to engage sockets 18 in a member 19 mounted on a squared portion 20 of the shaft 9 to rotate therewith, when the drum is shifted outwardly from its neutral position. Thus, it will be seen, the movement of the drum 14 locks the sleeve 13 to the frame or clutches it to the shaft 9 as the case may be. The drum is shifted one way or the other by means of a lever 21 pivoted to an arm 22 secured to the frame and having arms 23 which straddle the drum and are provided with pins engaging a groove formed in the drum's periphery. At the end of the sleeve is a drum 24 which is integral with the sleeve or suitably secured thereto and which is embraced by a band 25, of the "brake band" type connected by suitable levers 26, which are pivoted to the member 19, with a drum 27 slidable on the shaft 9 but rotating therewith. It will be seen that the movement of the drum 27 one way or the other (which is accomplished by a lever 21ª in the same manner as the drum 14 was shifted as above described) will tighten or loosen the band 25 on its drum, the parts in question providing, in effect, a variable frictional clutch between the sleeve and the shaft.

As the drum 24 is between drum 14, carrying the clutching pins 17, and member 19 in which are the corresponding sockets 18, suitable apertures are made in the drum 24 for the passage of the pins when the clutch is operated. At the end of the shaft 9 is a pinion 28 meshing with a gear 29 secured to the traction wheel 4. Thus, it will be seen, the rotation of shaft 9 serves to propel the tractor. When the parts are in the position shown in Fig. 2, power being applied to the shaft 6, the tractor will be at rest as there is no connection between the shaft 9 and the sleeve which will rotate freely. If, however, the lever 21 is moved to throw the drum 14 out of its neutral position, to lock the clutch members 15, 16, the sleeve will be locked to the frame. Consequently the pinions 11 instead of turning the gear 12 which is on the sleeve can only travel over the same, but, owing to their connection with the shaft, they will rotate the latter and under these conditions the tractor will travel at half speed. (Unless otherwise noted it is understood that the parts on each side of the divided shaft are operated correspondingly.)

Manipulation of the lever 21 in the opposite direction will cause the clutch pins 17 to engage the sockets 18, thus locking sleeve and shaft together and causing the tractor to be propelled at full speed. The speed may be varied by manipulation of the lever 21$^a$ which controls the variable friction clutch as a greater or less release of the band 25 permits clutch connection to slip to a greater or less extent, thus increasing or decreasing the speed within certain limits.

Not only is the speed of the tractor regulated by the levers 21 and 21$^a$ but the vehicle is steered in the same manner. It will be apparent that if both of the traction wheels 4 are driven at the same speed the tractor will proceed in a straight line but that if one wheel moves faster than the other the vehicle will turn one way or the other. Accordingly it is possible, by my invention, to steer the tractor effectively and with precision by varying the relation of the speeds at which the two traction wheels are driven. For example, if the lever 21 on the right hand side is in neutral position and the similar left hand lever has clutched the sleeve to the shaft, it will be seen that the left hand wheel will be driven at full speed, whereas the right hand wheel will have no power applied to it, and consequently it will act as a pivot, the tractor making a sharp turn to the right. A somewhat wider turn is made if one wheel is set at half speed, by locking the corresponding sleeve to the frame, and the other wheel rotates at full speed. Slight turns are made by manipulating levers 21$^a$ to vary the frictional contact between the bands 25 and their drums 24. For example, if the left hand band is slightly released, the right hand wheel being kept at full speed. the left drum 24 can slip a little, thus slightly reducing the speed of the left hand shaft and wheel and the tractor will turn slightly to the left. Manipulation of the bands 25 also makes it possible to bring the drums 24 and member 19 in such position that the clutch pins 17 can readily be shifted into the sockets 18 when it is desired to make the full speed connection.

It will be seen that I have provided means for steering a tractor from the traction wheels such that there is no undue loss of power as the differentiation on one side or the other is not obtained by braking the power.

Having thus described my invention what I claim as new and desire to secure by Letters Patent is:

1. In steering means for a tractor, the combination with a pair of traction wheels and a source of power carried by the tractor, of independent positive clutch connections between said power and each wheel, and variable clutch connections between the power and each wheel, said variable clutch connections being independent of each other and of said positive clutch connections.

2. In steering means for a tractor, the combination with a pair of traction wheels, and a source of power, of means for connecting the power to either wheel to drive the same at full speed, selective means for positively connecting the power to either wheel to drive the same at half speed, means for connecting the power to either wheel to drive the same at variable speeds and means for disconnecting the same, the conditions with regard to one wheel being independent of conditions regarding the other.

3. In steering means for a tractor, the combination with a divided shaft, of a sleeve on each section of said shaft in operative connection with the power of the tractor, means for locking said sleeves to their corresponding shaft sections and a variable clutch connection between said sleeves and their corresponding shaft sections.

4. In steering means for a tractor, the combination with a divided shaft, of a sleeve on each section of said shaft in operative connection with the power of the tractor, means for clutching said sleeves and their corresponding shaft sections, means for locking said sleeves against rotation, and means whereby said shaft sections are caused to rotate at a reduced speed when said sleeves are so locked.

5. In steering means for a tractor, the combination with a divided shaft, of a sleeve on each section of said shaft in operative connection with the power of the tractor, means for locking either of said sleeves, independently of the other, to the corresponding shaft section, and independent variable clutch connections between each sleeve and its shaft section.

6. In steering means for a tractor, the combination with a divided shaft, of a sleeve on each section of said shaft in operative connection with the power of the tractor, means for clutching either of said sleeves, independently of the other, to its corresponding shaft section, means for locking either of said sleeves, independently of the other, against rotation, and means whereby such shaft section is caused to rotate at a reduced speed when said sleeve is so locked, said locking means being independent of said clutching means.

7. In steering means for a tractor, the combination with a pair of traction wheels, of a divided shaft each section of which is operatively connected with one of said wheels to drive the same, a sleeve on each section of said shaft, a driven gear rotating on said shaft and meshing with a plurality of pinions on each section of said shaft, the trunnions of which are arranged to rotate with said shaft, a gear on each sleeve meshing with said pinions, independent means for clutching either sleeve to its shaft section, independent means for locking either sleeve against rotation, and independent variable clutch connections between each sleeve and its shaft section.

8. In steering means for tractors, the combination with a pair of traction wheels, of a divided shaft, each section of which is operatively connected with one of said wheels to drive the same, a sleeve on each section of said shaft, a driven gear rotating on said shaft and meshing with a plurality of pinions on each section of the shaft, the trunnions of which are arranged to rotate with said shaft, a gear on each sleeve meshing with said pinions independently operated, slidable drums associated with each sleeve having means associated therewith whereby the sleeve is operatively connected with its shaft section when the drum is in one position and locked against rotation when the drum is in another position, and independent variable clutch connections between each sleeve and its shaft section.

9. In steering means for a tractor, the combination with a pair of traction wheels, of a divided shaft, each section of which is operatively connected with one of said wheels to drive the same, a sleeve on each section of said shaft, a driven gear rotating on said shaft and meshing with a plurality of pinions on each section of said shaft, the trunnions of which are arranged to rotate with the shaft, a gear on each sleeve meshing with said pinions, means associated with each shaft section and independent of each other for positively clutching the corresponding sleeve to its shaft section and for positively locking the sleeve against rotation, and independent variable clutch connections between each sleeve and its shaft section.

In witness whereof, I have hereunto subscribed my name in the presence of two witnesses.

WILLIAM F. DOYLE.

Witnesses:
   JAMES A. STONE,
   HAZEL WINNIE.